Figure 3:
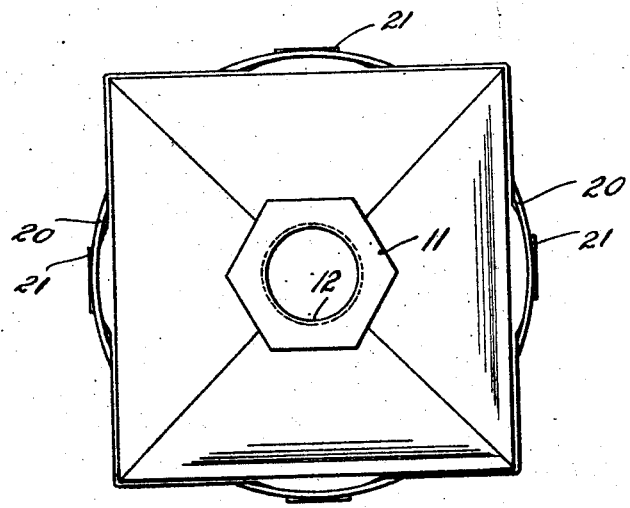

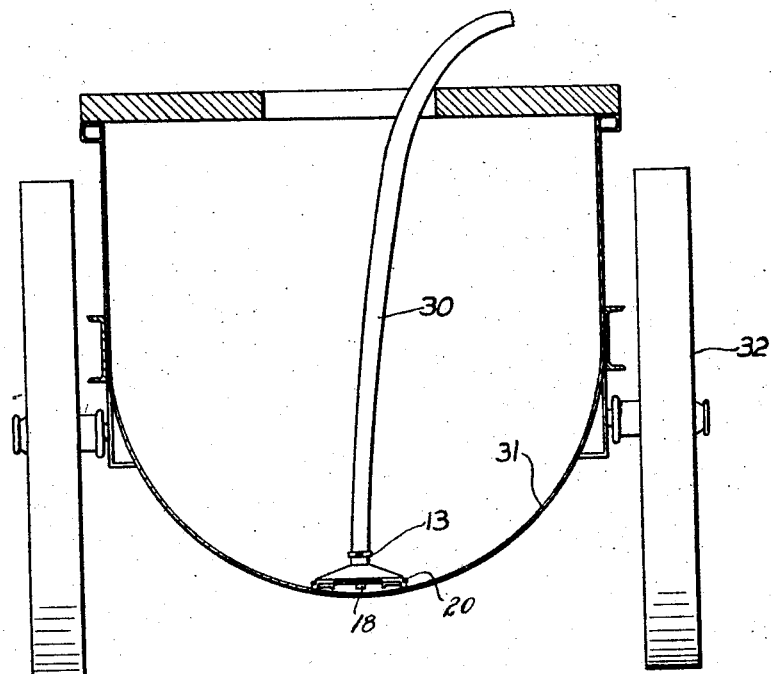
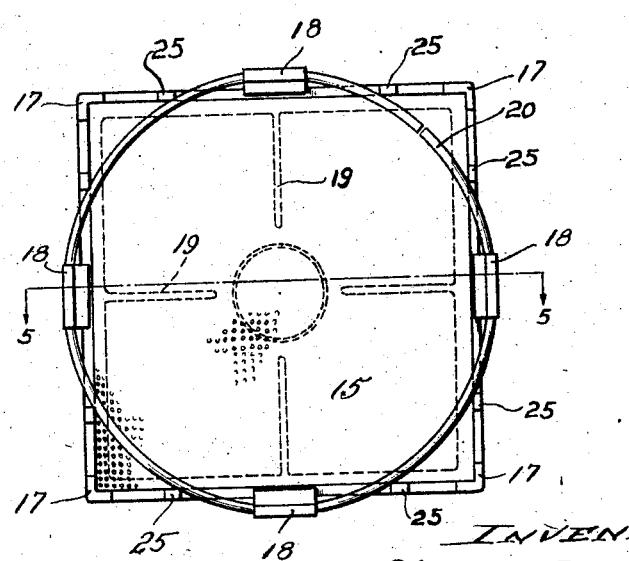

May 25, 1926.

C. CORNWALL

SUCTION STRAINER

Filed March 7, 1924

1,586,292

2 Sheets-Sheet 2

INVENTOR
Charles Cornwall,
By Baker & Macklin,
ATTORNEYS

Patented May 25, 1926.

1,586,292

UNITED STATES PATENT OFFICE.

CHARLES CORNWALL, OF SALEM, OHIO, ASSIGNOR TO THE DEMING COMPANY, OF SALEM, OHIO, A CORPORATION OF OHIO.

SUCTION STRAINER.

Application filed March 7, 1924. Serial No. 697,627.

This invention relates to suction strainers which are adapted to be removably attached to a hose and to be immersed within a liquid for straining it as it enters the hose. An object of my invention is to provide a strainer which may be readily dismantled for cleansing or repair purposes and which is very simple in construction and therefore capable of being easily manufactured.

A further object of my invention is the provision of a strainer having the screen so disposed thereon that liquid may be effectively drawn through the strainer until practically the entire contents of a receptacle are removed.

I prefer to carry out the above objects by providing a hollow body having spaced feet thereon which are adapted to rest on the bottom of a receptacle. The spaces between the feet admitting the contents to be pumped through the strainer, while a layer of foraminous material is removably disposed across the bottom of the body portion and is adapted to be held in place by a member which is woven between the feet of the body. I thus eliminate the necessity for relatively movable securing members, which when subjected to the action of chemicals, are apt to be corroded and thereby rendered inoperative. The preferred arrangement of parts embodying my invention is illustrated in the drawings, and is hereinafter set forth in detail in the following description. The essential characteristics of my invention are summarized in the claims.

Figure 4:
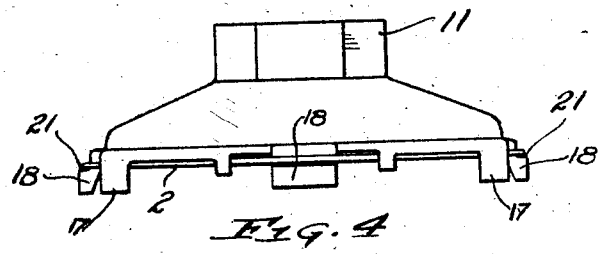

In the drawing Fig. 1 is a transverse section taken through a tank mounted on a vehicle, and showing one use for a strainer embodying my invention; Fig. 2 is a bottom view of the device shown in Fig. 1; Figs. 3 and 4 are plan view and side elevation respectively of the device embodying my invention; and Fig. 5 is a section taken on the line 5—5 in Fig. 2.

Figure 5:
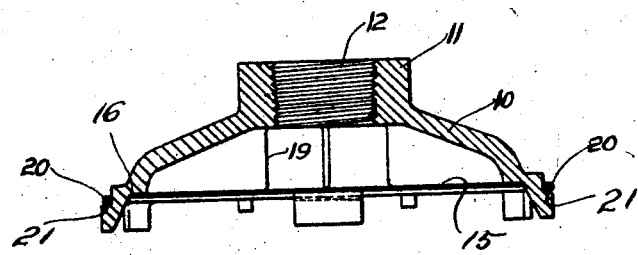

My invention is illustrated as having a body the sides of which are indicated at 10, as terminating in a boss 11 which may be threaded internally as at 12, to permit attachment of a hose coupling 13 as shown particularly in Fig. 5. The sides as shown form a hollow pyramid, the base of which comprises a layer of foraminous material indicated at 15. The body has a downwardly facing a shoulder 16, preferably on the inner side thereof and extending around the marginal edges thereof to receive the screen 15.

To position the screen above the bottom of a receptacle in which the cleaner is placed, I have shown feet 17 adjacent the corners of the device, and have shown feet 18 adjacent the mid-portion of each side. The space between the feet is sufficient to permit the inlet of liquid to be pumped.

To attach the screen to the body of the device, I have shown a member 20 which is preferably a ring of spring metal or wire threaded between the feet. As shown particularly in Fig. 4, the member 20 rests on shoulders which prevent it from sliding downwardly, and which are so spaced with reference to the shoulder 16 that the screen may be held in close fitting engagement with the body. Spaced ribs 19 within the body also serve to limit inward movement of the screen and also to strengthen the body.

To assist in retaining the member 20 in position I have illustrated, particularly in Fig. 2, spaced lugs 25 which extend downwardly from the sides of the body, and cooperate with the feet 18 to hold the ring 20 in locked position. The function of these lugs is illustrated in Fig. 2, wherein each lug engages the outer edge of the ring, while each foot 18 engages the inner edge of the ring. Thus the ring is centered between downwardly extending portions and is maintained in position by the resilient characteristics of the material of which the ring is made.

In Fig. 1 my invention is shown as attached to a hose 30 which extends into a tank 31. This tank is illustrated as being supported on wheels 32 for use in connection with spraying apparatus. This view shows the strainer at the bottom of the tank and illustrates the effectiveness by which the tank may be drained.

A strainer made in accordance with my invention has an advantage from the viewpoint of manufacture, in that the body may be made of a single casting, while the screen may be cut from a roll of material, and placed directly into engagement with the body. Thereupon the screen may be secured in position by the flexible ring which can quickly be threaded between the downwardly extending portions on the body. My invention is also advantageous from an operating viewpoint in that the cleaner can be disassembled without disconnecting the hose, so as to clean the parts without the need for special tools and thereafter can be quickly assembled. Moreover, the screen is positioned adjacent to the bottom of the device, wherefore a receptacle may be effectively drained when the strainer rests on the bottom thereof.

I claim:

1. In a device of the character described, the combination with a hollow body member having an open bottom and downwardly projecting spaced feet, of a screen, and a spring retaining member lying outside of some of the feet and inside the others for holding the screen against said body member.

2. In a device of the character described, the combination of a hollow body having a substantially square lower portion with a downwardly facing internal shoulder, and with feet located at intermediate positions on the sides of the square, a substantially square screen lying beneath said shoulder, and a substantially circular retaining wire engaging said feet and passing beneath the corners of the screen for retaining it in place.

3. In a device of the character described, the combination with a hollow body having a downwardly facing shoulder therein, adjacent the marginal edges thereof, a screen comprising a layer of foraminous material, a spring retainer for holding the screen in engagement with said member, and projections on the body for maintaining the spring retainer in place.

4. In a device of the character described, the combination with a hollow body member having a downwardly facing shoulder adjacent the marginal edges thereof, and on the inner side thereof, a screen comprising a layer of foraminous material in engagement with said shoulder, spaced feet on said body member and a member threaded between said feet and engaging the body member to hold the screen in engagement therewith.

5. In a device of the character described, the combination with a hollow body member having a downwardly facing shoulder, a screen bearing against the shoulder, said body having spaced downwardly extending portions, a ring threaded between said portions and engaging the screen for holding it in position against the body member, at least one of said portions having an upwardly facing shoulder to position the ring.

6. In a device of the character described, the combination with a hollow pyramidal member, means adjacent the apex of said member for permitting attachment thereof to a hose conduit, a screen adjacent the base of said member, spaced lugs on said member, and a retainer threaded between said lugs for positioning the screen on said member.

7. In a device of the character described, the combination with a hollow body member, having spaced feet, said feet having upwardly facing shoulders on the outer side thereof, a screen within said member and above said feet, spaced lugs disposed on said member outside the screen and between said feet, and a ring engaging the shoulders and also said lugs for positioning the screen with reference to said member.

In tesimony whereof, I hereunto affix my signature.

CHARLES CORNWALL.